April 9, 1963  L. M. PLAISANCE  3,084,666
COMBINATION BIRD BATH AND PLANT RECEPTACLE SUPPORT
Filed Jan. 5, 1962
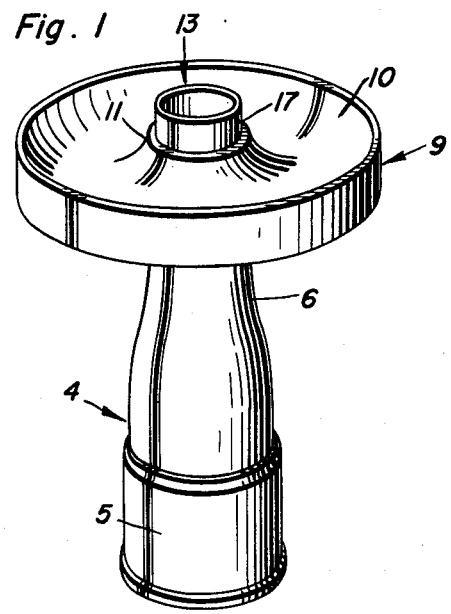
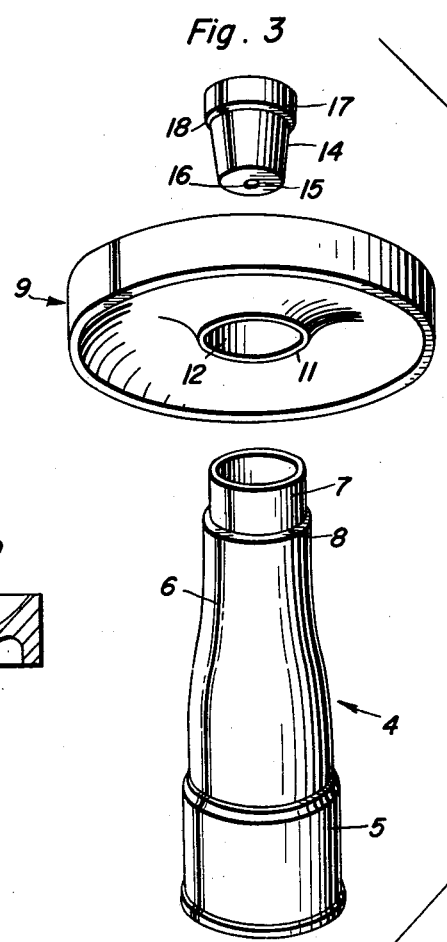
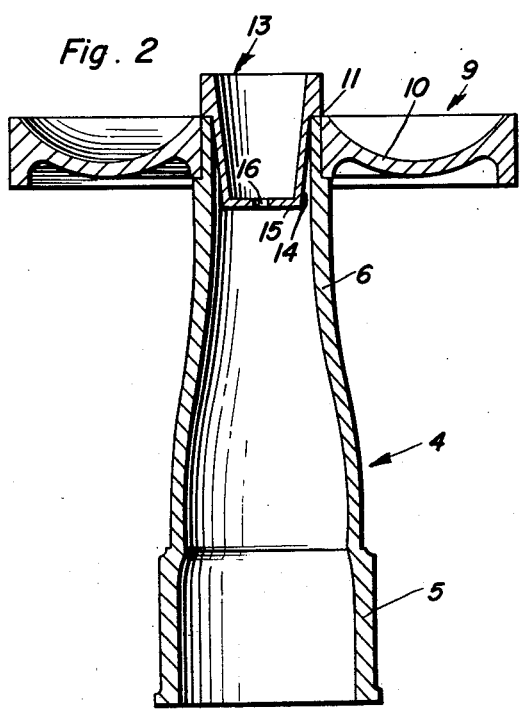
Louis M. Plaisance
INVENTOR.
BY *Clarence A. O'Brien*
*and Harvey B. Jackson*
Attorneys 3,084,666
Patented Apr. 9, 1963

3,084,666
COMBINATION BIRD BATH AND PLANT RECEPTACLE SUPPORT
Louis M. Plaisance, 2462 N. Lake Drive, Milwaukee, Wis.
Filed Jan. 5, 1962, Ser. No. 164,542
4 Claims. (Cl. 119—1)

This invention relates to new and useful improvements in bird baths, and has for one of its important objects to provide, in a manner as hereinafter set forth, a device of this character comprising a saucer or pan which is shaped to define an annular water trough in which the birds may bathe, said trough encircling a raised apertured central or hub portion receiving the upper end portion of a tubular pedestal or column having removably mounted therein a container for the reception of flowers, vines and other live vegetation whereby the water may be shaded and kept comparatively cool in addition to enhancing the appearance of the device and increasing its attractiveness to birds.

Another important object of the present invention is to provide a bird bath of the aforementioned character wherein the construction of the several parts or units is such as to facilitate assembly and which, when erected, will be firmly retained in position.

Other objects of the invention are to provide an improved bird bath of the character described which is comparatively simple in construction, strong and durable, highly ornamental and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a perspective view of a bird bath constructed in accordance with the present invention;

FIGURE 2 is a view in vertical section through the device; and

FIGURE 3 is a perspective view of the invention, showing the parts separated.

Referring now to the drawing in detail, it will be seen that the embodiment of the invention which has been illustrated comprises a tubular column, post or pedestal of suitable material and dimensions which is designated generally by reference numeral 4. The pedestal 4, which is circular in horizontal section, comprises a cylindrical lower or base portion 5 and a gradually reduced upper or stem portion 6. The pedestal 4 further includes an externally reduced, cylindrical upper end portion or neck 7 providing a circumferentially extending shoulder 8.

Removably and rotatably mounted on the pedestal 4 is a saucer, pan or tray 9. The saucer 9, which is formed to provide a circular or annular water trough 10, comprises a raised, cylindrical central or hub portion 11 defining a circular opening 12 which receives the neck 7, said hub resting on the shoulder 8.

Removably mounted in the upper portion of the pedestal 4 is a receptacle or container in the form of a flower pot 13. The pot 13 includes, as usual, a downwardly tapered body 14 having a flat bottom 15 provided with a drain opening 16. The pot 13 further includes an enlarged cylindrical upper portion 17 providing an external circumferential shoulder 18 which is adapted to seat on the upper end of the pedestal 4. Thus, the pot 13 is suspended in the upper portion of the pedestal 4 and the cylindrical portion 17 of said pot is flush with the circumference of the neck 7 and constitutes a continuation thereof. It also will be observed that the upper end or top of the hub 11 of the saucer 9 is flush with the upper end of the pedestal 4 and the shoulder 18 in the assembly.

It is thought that the use of the device will be readily apparent from a consideration of the foregoing. Briefly, the pedestal 4 is erected in a suitable location and the saucer 9 is mounted thereon. The pot 13 is then mounted on the upper end of the pedestal 4. The trough 10 is then filled with water to the desired level for the use of the birds. Flowers, vines and other vegetation may be placed in the pot 13 for shading the water and lending a natural appearance to the pool thus provided for making it more inviting to the birds in addition to enhancing its attractiveness. Of course, excess water in the pot 13 may drain through the hole 16 through the pedestal 4 to the ground. The construction and arrangement, it will be observed is such that the saucer and pot 9 and 13, respectively, may be independently removed and replaced. Also, the saucer and plate 9 and 13 are relatively rotatably adjustable on the pedestal 4. Still further, the saucer 9 may be readily inverted on the pedestal 4 when it is not desired to use the bath as, for example, in cold weather when water in the trough 10 would be frozen over long periods of time. The construction of the saucer 9 with the annular trough 10 therein also is such as to facilitate rapid and thorough cleaning.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bird bath comprising a tubular pedestal of generally circular horizontal section open at both ends and including an externally reduced, substantially cylindrical upper end portion providing a generally horizontal, upwardly facing circumferential shoulder, a closure in the form of a flower pot comprising an enlarged, cylindrical upper portion providing a horizontal, downwardly facing circumferential shoulder seated in the top of the pedestal for telescopically suspending said flower pot therein, and a circular saucer, for the reception of water, mounted on the pedestal and including a central hub telescopically receiving said reduced upper portion of said pedestal and generally flush with the top thereof and resting on the first-named shoulder, said upper pedestal portion and said hub being cylindrical whereby the saucer is rotatably adjustable relative to the flower pot, removable from the pedestal and invertible thereon.

2. A bird bath in accordance with claim 1, said flower pot being rotatably adjustable on the pedestal independently of the saucer and independently removable from said pedestal.

3. A bird bath in accordance with claim 2, said cylindrical flower pot portion being flush with said cylindrical pedestal portion for slidably receiving the hub whereby the saucer may be removed from the pedestal and replaced in either position thereon without disturbing the flower pot.

4. A bird bath in accordance with claim 3, said flower pot being generally downwardly tapered and further comprising an apertured bottom communicating said flower pot with the tubular pedestal.

References Cited in the file of this patent
UNITED STATES PATENTS 1,806,123     Smith _____ May 19, 1931
2,002,378     Richardson _____ May 21, 1935